(12) United States Patent
Kinzer et al.

(10) Patent No.: US 6,177,771 B1
(45) Date of Patent: Jan. 23, 2001

(54) AUTOMATIC DOOR OPERATOR

(75) Inventors: Karl P. Kinzer, Torrington; Christopher M. Simo-Kinzer, Thomaston, both of CT (US); Richard J. Leblanc, Boston; Gary J. Miller, Saugus, both of MA (US)

(73) Assignee: Brookfield Industries, Inc., Thomaston, CT (US)

( * ) Notice: Under 35 U.S.C. 154(b), the term of this patent shall be extended for 0 days.

(21) Appl. No.: 09/448,156

(22) Filed: Nov. 24, 1999

(51) Int. Cl.[7] .......................................................... H02P 1/00
(52) U.S. Cl. .......................... 318/280; 318/468; 318/466; 318/467; 318/280; 318/445
(58) Field of Search ................................... 318/468, 466, 318/467, 470, 280, 445, 443

(56) References Cited

U.S. PATENT DOCUMENTS

| | | |
|---|---|---|
| 4,234,833 | 11/1980 | Barrett . |
| 4,563,625 | 1/1986 | Kornbrekke et al. . |
| 5,018,304 | 5/1991 | Longoria . |
| 5,453,736 | 9/1995 | Norén . |
| 6,028,370 | * 2/2000 | Lamm et al. .......................... 318/468 |

* cited by examiner

*Primary Examiner*—Karen Masih
(74) *Attorney, Agent, or Firm*—McGlew and Tuttle, P.C.

(57) ABSTRACT

An automatic door operator with a motor connectable to a door through gear units and linkages and for moving the door between an open and a closed position. An absolute position transducer measures the absolute position of the door independently of previous positions of the door and substantially continuously. A control senses an external signal indicating one of a desired open state and closed state of the door. The control compares the absolute position of the door with the external signal and generates the drive signal to drive the motor to cause the absolute position to be substantially identical to the external signal. The motor is a regenerative drive operatable in all directional combinations of electrical driving torque and motor rotation. The control electrically drives the regenerative drive in a direction opposite a rotation of the regenerative drive to brake a load applied to the motor. The control also limits the current to the motor, to limit the force the motor applies to the door. The combination of current limiting and the regenerative drive allows the door to be externally forced opposite to motor force without substantially damaging the door operator.

15 Claims, 7 Drawing Sheets

QUADRANT II    QUADRANT I

QUADRANT III    QUADRANT IV

MOTOR ROTATION     MOTOR TORQUE

NOTE: ARROWS IN SAME DIRECTION = MOTOR ACTION
      ARROWS IN OPPOSITE DIRECTION = REGENERATIVE ACTION

AUTOMATIC DOOR OPERATOR

FIELD OF THE INVENTION

The present invention relates to a process and device for automatically controlling the opening and closing of a door, and in particular to pivoting doors weighing in excess of 20,000 pounds at a relatively high frequency of usage, such as the lead doors for linear accelerator rooms used for the treatment of cancer patients.

BACKGROUND OF THE INVENTION

A door operator is known from the U.S. Pat. No. 5,018, 304 and offers a variable torque clutch as a method of controlling operating torque and free egress. In many applications, especially linear accelerator doors, it is desirable, and some times mandated, that the door be movable by an external force below a predetermined magnitude. This is done, so that in an emergency situation such as during a power failure, it is still possible to open and close the door. In the patent to Longoria, an electromagnetic clutch is used which is supposed to slip at a predetermined value. This design has been found to be less than optimal with respect to when the clutch should and should not slip in actual field conditions. Research into presently available electromagnetic clutches, finds that present manufacturers do not recommend using electromagnetic clutches in slip clutch applications, and the electromagnetic clutches are preferably only to be used as an on/off clutch. In particular the potentiometer voltage control of these clutches is only for adjusting the start-up and running modes, and not meant to control slippage.

Automatic door operators are known for standard commercial doors, such as those seen in department stores. These swinging doors are mostly only powered in one direction and have a spring return for the other direction. Spring returns are known to have difficulty operating the movement of a door if particular problems such as out of plum or misalignment of the frame, or a pressure differential exists in a particular installation. The standard commercial door operators, because of their design, are usually limited to applications where the door weighs less than 4,500 pounds. When the weight of the door exceeds this amount, the standard controlling and driving devices experience problems.

One of the problems, such as in applications similar to U.S. Pat. No. 5,453,736 to Noren, is that the position of the door is measured using an encoder with a counter. Movement of the door generates a series of pulses, which are then counted to determine how much the door has moved. When power is interrupted, when electrical noise is present, and/or an automated door operator needs to be reset, encoder/counter systems need to move the door to a start or home position and then reset the counting. If the door operator of Noren was used on a linear accelerator door during a power failure, during electrical noise or reset, a door weighing up to 20,000 pounds is being moved without any microprocessor control, until the door is returned to its start or home position. This can be a dangerous situation.

Also the motor and drive train used for relatively light weight doors, are not significantly effected by the weight of the door. Braking or slowing of the door is therefore not a significant consideration. With doors weighing up to tens of thousands of pounds, the driving of the extra weight of the door is accomplished by using a much more powerful motor and drive train, however, such factors such as slowing, braking and the door overrunning the motor now become significant problems, as is the importance of power operation in both the forward and reverse directions.

SUMMARY AND OBJECTS OF THE INVENTION

It is a primary object of the present invention to provide an automatic door operator for very massive doors, which overcomes the above problems, and is simple and convenient to manufacture, install and operate.

The present invention accomplishes this by having a motor connectable to a door for moving the door between an open and closed position, and to a plurality of positions in between. An absolute position transducer is provided for measuring an absolute position of the door. A control means senses an external input signal indicating one of an open state and a closed state of the door, and any one of the plurality of in between positions. The control means compares the absolute position of the door with the position or state indicated by the external signal and the control means generates a drive signal to the motor for driving the motor until the absolute position is substantially identical to the position indicated by the external signal. The in between positions are preferably preset by the operator at the time of installation and can be modified at any time. The preset in between positions can also be used to indicate where the speed of the door should be changed.

The absolute position transducer measures the absolute position of the door independently of previous positions of the door. By absolute position, it is intended that the measuring of the position does not depend on the direction or movement of the door. The present invention is able to determine the position of the door without movement of the door and without needing knowledge of the previous positions of the door.

The control means of the present invention is preferably a digital Programmable Logic Control (PLC), and the absolute position transducer is an analogue device such as a rotary potentiometer which is continuously able to report position regardless of whether the door is moving or not. An analogue/digital convertor is then used to convert the analogue voltage signal from the potentiometer into a digital signal which can then be read by the digital PLC.

The motor of the present invention is a full wave four quadrant regenerative drive which is designed to be operatable in all four combinations of driving torque and motor rotation. The most common combination, is when the electrical current applied to the motor produces a torque that is in the same direction as the present rotation of the rotor of the motor. Many motor drives for swinging doors are only one directional, and electrical driving torque to the motor can only be in one direction. Some motor drives are bidirectional, where the torque and the direction, while always having to be in the same direction, can both either be forward or backwards. A full wave four quadrant regenerative drive can have the electrical driving torque in either direction to the rotation of the motor, and does not require that the electrical driving torque be in the same direction as the present rotation of the motor. This allows a four quadrant regenerative drive to actively brake the rotor, control an overrunning motor, and even quickly reverse the rotation of a motor without contractors, switches, brake resistors and inhibit plugs. All the braking, slowing, reversing and controlling of overrunning, is done by controlling the direction and magnitude of the energy being supplied to the regenerative drive. The control means of the present invention actively controls the movement of the door by electrically driving the regenerative drive in directions opposite to the actual and present rotation of the regenerative drive. The control means generates the energy of the motor back into the AC source thus providing motor torque opposite of motor rotation of the regenerative drive.

In the field of linear accelerator doors, it is important that the door be closed before the linear accelerator can operate. The linear accelerator therefore usually has limit switches which are separate from the door operator to determine when the door is closed and the linear accelerator will not operate until these limit switches indicate that the door is closed. Aging of the door, the surrounding frame, and even of the entire building, can cause alignment of the door to deviate from an optimal state. Misalignment can also be caused by warping, settling, or even the initial installation being out of tolerance. This misalignment can bias the door away from its fully closed state. Also with the forced air ventilation in modem buildings, a significant amount of air pressure can build up on the doors between two rooms. All of these forces can cause a door to be slightly moved away from fully closed, especially after the motor has fully closed the door and the motor is then stopped without the system backlash being removed.

The control means of the present invention performs a clamping function where the position of the door is substantially continuously compared with the external signal, especially when the external input signal indicates that the door should be closed, and the absolute position transducer has already indicated that the door is closed. Whenever the absolute position transducer indicates that the door has varied from the fully closed position, and the external signal still indicates that the door should be fully closed, the control means generates the drive signal to operate the motor in the direction to have the absolute position transducer indicate that the door is fully closed.

In order to prevent an object in the path of the door from being unduly damaged, and in accordance with the Entrapment Protection criteria of ANSI 156.10 for swinging doors, the control means of the present invention determines the maximum force allowed to be applied to the door, and the magnitude of motor current which corresponds to the maximum force allowed to be applied to the door. The control means then maintains the magnitude of the current delivered to the motor as a result of the drive signal, to a magnitude below the magnitude corresponding to the maximum force allowed to be applied to the door. This magnitude is less than the maximum current that can be applied to the door, and less than the total force possible to be applied by the motor to the door. In this way, even if the automatic door operator is erroneously commanded to a particular position, it will not apply an undue force to any objects in the path of the door.

A further important feature of the present invention, is the ability to be able to move the door by an external force, even if no drive signal is applied to the motor. As described above, the full wave four quadrant regenerative drive allows the motor to rotate in a direction opposite to the direction of the electrical driving torque. Therefore the door can be externally opened or closed by external forces (backdrive), regardless of the power to the motor, without damaging the motor. Also due to the current limiting, moving the door against the electrical driving torque will not cause an increase in the motor torque higher than the maximum value.

A door gear drive is used to connect the motor to the door. The door gear drive, current limiting and motor are designed so that the door can be manually opened with the power removed by a force not greater than 50 lb. applied 1 inch from the latch as stated in ANSI 156.10 Para. 10.2. To accomplish this, the overall gear reduction ratios, mechanical advantage of the linkage arm and the effective door width must be factored into the design to assure the system backdrives properly. Friction and inefficiencies must be taken into account. While the door is in motion ANSI 156.10 Para 9.0 stipulates external forces must not exceed 40 lb. at 1 inch from the latch within the guidelines of 9.2 & 9.4. Since this is not a backdrive condition but a stall condition, it becomes primarily a function of current limiting of the motor and mechanical advantage of the linkage arm and effective door width. This thus eliminates the need for slip clutches and their corresponding limitations and wear problems.

The door operator of the present invention is thus able to be easily constructed, and both simple and reliable in operation.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
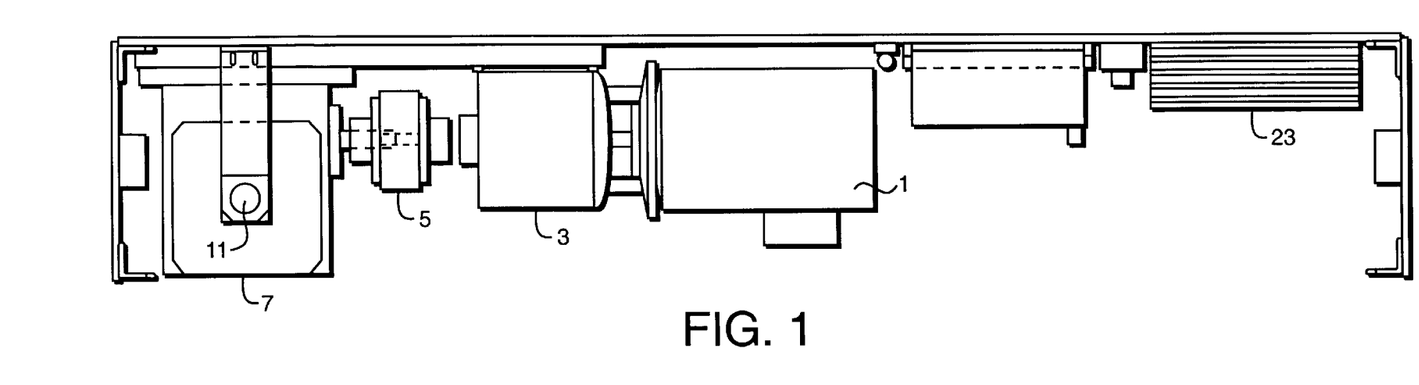
FIG. 1 is a top view of the components in the automatic door operator.
Figure 2:
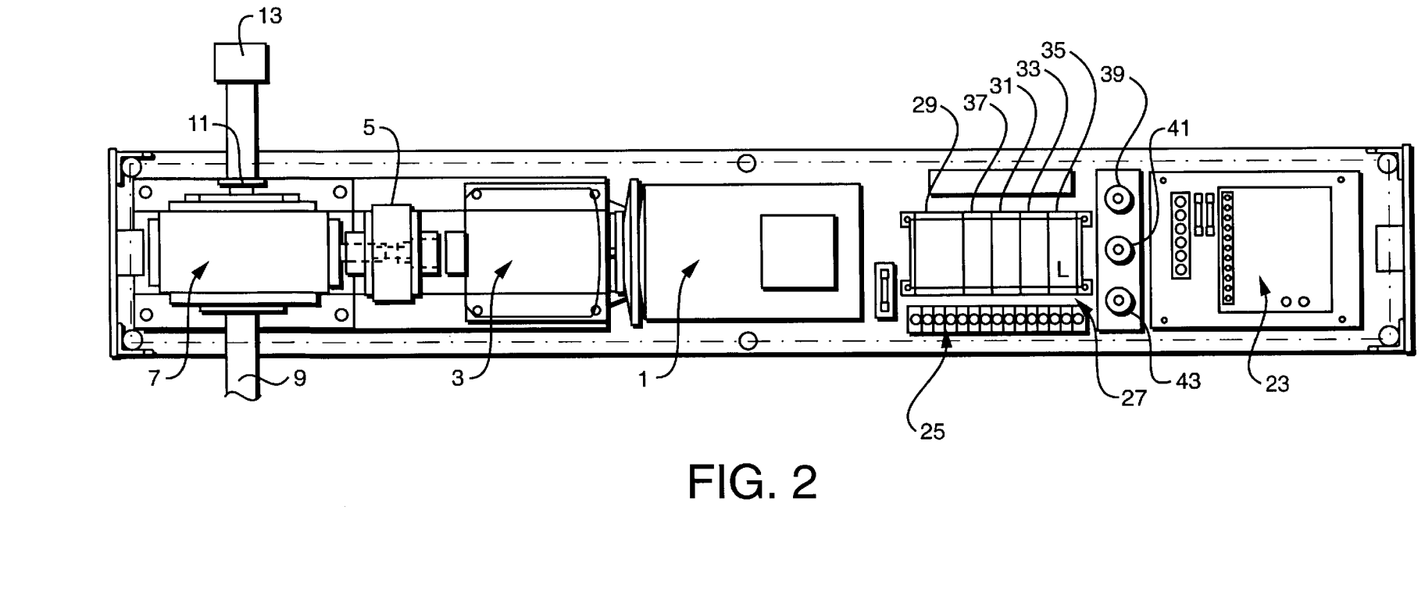
FIG. 2 is a side view of the components of the automatic door operator.

Referring to the drawings, and in particular to FIG. 1, a motor 1 is used to provide the motor force for the actual movement of the door. In a preferred embodiment, the motor is a one quarter horse power 1750 rpm 90 volts dc regenerative drive motor. The motor 1 is connected to a door gear reduction unit 3 which preferably has a ratio of 125:1 and is a helical in-line unit. Rotary motion from the gear reduction unit is transferred via a flexible coupling 5, and from there the rotary motion undergoes a substantially 90° change in direction via a worm gear unit 7. In the preferred embodiment, this worm gear unit also applies gear reduction in the ratio of 5:1. An output axle or shaft 10 of the worm gear unit has a first end 9 which connects to linkage which then connects to the door. A second end 11 of the output shaft 10 of the worm gear unit 7 is connected to a rotary position transducer 13 for measuring the position of the door.

Figure 3:
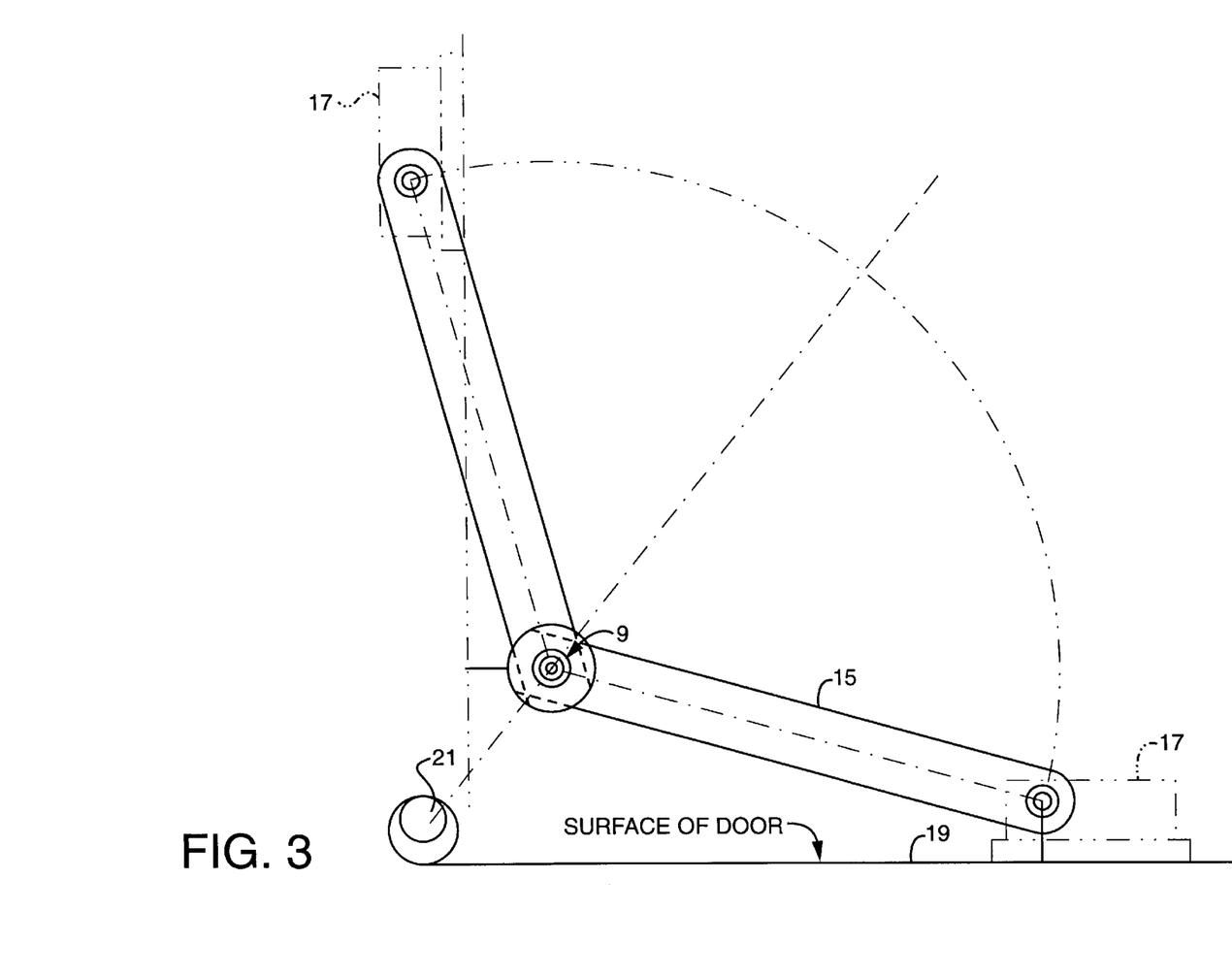
FIG. 3 is a schematic view of the linkage connecting the door operator to the door.

FIG. 3 shows a schematic view of the linkage connecting the door operator to a door, using a typical set of dimensions. The door operator itself is not shown, however the first end 9 of the output shaft 10 of the worm gear unit 7 is shown.

Rotary movement from the worm gear unit 7 rotates a linkage 15 about the first end 9. An end of the first linkage 15, opposite the first end 9, is connected to one end of a sliding pivot 17. The sliding pivot 17 is connected to the door 19 at a position spaced away from the hinge pin center line 21. The actual dimensions and connections shown, are for illustrative purposes only, and the present invention can be used with other dimensions and linkage connections.

The motor 1 is driven by a regenerate motor control 23. A Programmable Logic Controller (PLC) 27 is provided for controlling the operation of the door operator based on information received from the rotary position transducer 13 and from external signals received via a terminal strip hook-up 25 and input module 33.

The PLC 27 preferably has a PLC power base 29, an analogue/digital converter 31, an input module 33, an output module 35 and a CPU 37 (central processing unit). The individual components of the PLC 27 is not limited to the above-described components, but can vary.

Speed units are also provided to drive the motor at different speeds. In the preferred embodiment, a creep speed unit 39, an open speed unit 41 and a closed speed unit 43 are provided.

The rotary position transducer 13 measures absolute position of the door independently of previous positions of the door and substantially continuously. This transducer is preferably a rotary potentiometer where resistance of the potentiometer changes based on the rotary position of the output shaft of the worm gear unit 7. A voltage is applied to the potentiometer and the output voltage of the potentiometer varies as the resistance is changed by the rotary movement of the output shaft. This output voltage is analogue and is converted into a digital value by the A/D converter 33. In this way, a digital signal is provided which absolutely and continuously represents the position of the door, regardless of what the position the door may have originally been in, and without movement of the door being needed.

Figure 4:
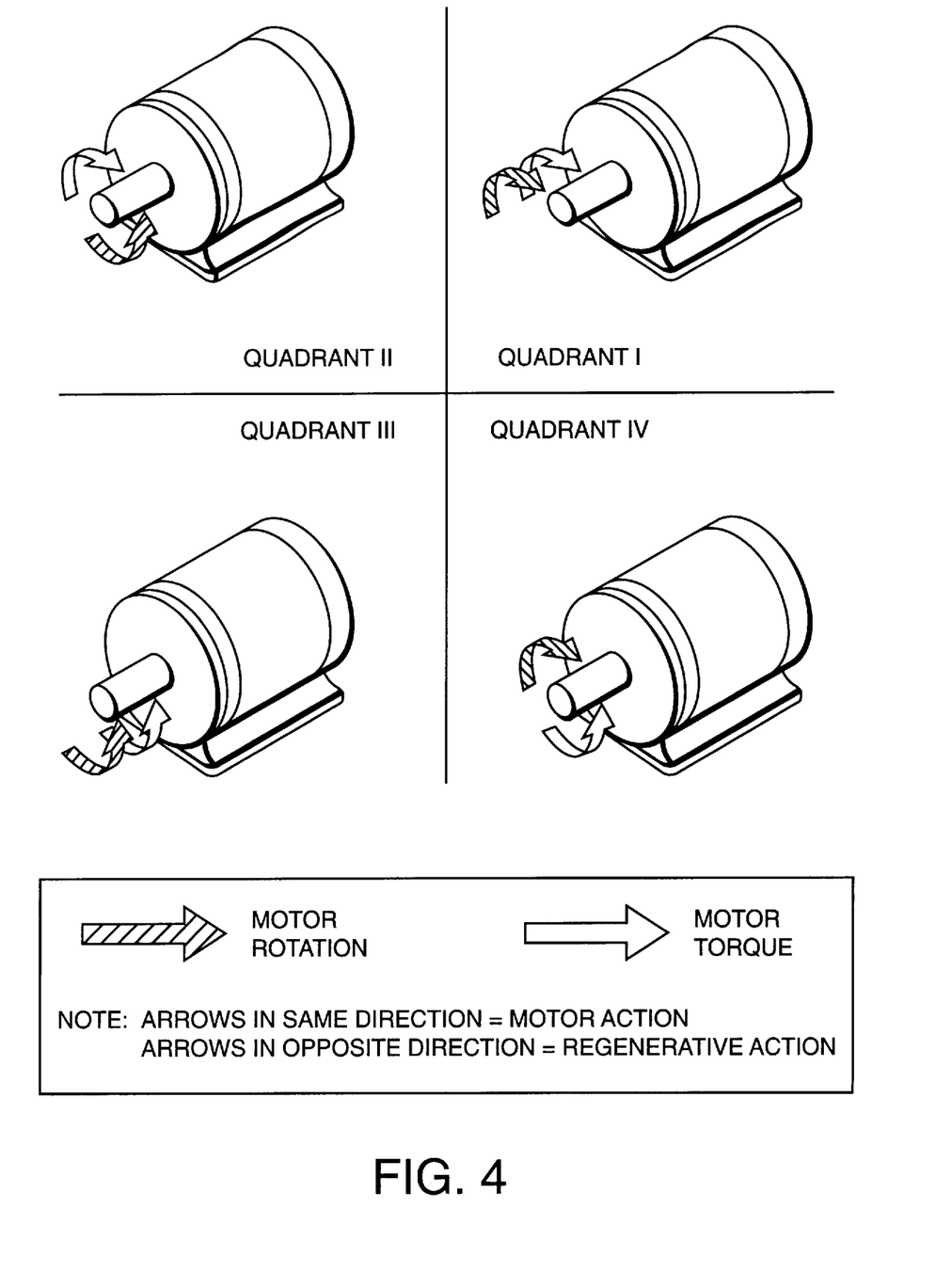
FIG. 4 is a diagram showing the different modes of operation of a regenerative drive motor.

The motor 1 is a regenerative drive motor which can operate in all four quadrants as shown in FIG. 4. The actual motor rotation and the motor torque provided by electrical current to the motor, can be in any combination of directions. Standard non-regenerative dc drives control current flow to a motor in one direction which is the same direction as the motor rotation. This operation occurs in quadrant 1, and can also occur in quadrant 3 if the drive and the motor is reversible. A limitation of these drives and motors, is that a full stop of the motor is required before the drive can reverse direction in order to prevent damage to the motor armature. Also when the load on a motor is externally moved faster than the motor is driven, a non-regenerative drive cannot brake or oppose this overhauling load, unless dynamic braking is used which requires disconnecting current from the motor and placing an electrical resistance across the electrical terminals of the motor. Unless dynamic braking is used, a non-regenerative dc drive and motor cannot decelerate a load faster than coasting.

Regenerative drives and motors operate in all four quadrants, even those where motor rotation and motor torque are opposite. Regenerative drives do not require that the motor be stopped before reversing direction, and do not require contractors, switchers, brake resistors and/or inhibit plugs to change direction. Regenerative drives allow for the reducing the speed of a motor, either due to overhauling, or stopping, faster than the time taken for a motor to naturally coast to the lower speed. In the heavy doors of linear accelerator housings, momentum is a significant factor and the naturally occurring friction in the pivots and gear units in addition to gear reduction ratios is not always sufficient to slow down a door by itself.

The PLC 27, speed units 39–43 and motor control 23 operate to limit the current to them motor, and thus limit the maximum force that the motor 1 applies to the door 19. Because of this current limiting, and the reversible feature of the regenerative motor 1, and also the design of the gear units, an external force less than a maximum allowable force, is able to be applied to the door to oppose the motor force. This allows emergency exit or closure of the door should an emergency situation occur. The nature of the regenerative drive, and the current limiting, is such that opposing the motor force will not damage the motor or motor control 23, and the amount of external force needed to oppose the motor force will remain reliably constant.

The PLC 27 substantially continuously compares the position of the door 19 as measured by the transducer 13, with external input signals received through terminal strip 25 and input module 33. This occurs, even after the door position and the external position agree, and the motor is shut-off. If an external force, such as a difference in air pressure causes a slight movement of the door 19 away from the desired position indicated by the external signal, the PLC generates a drive signal to the motor 1, to return the door to the desired position. This is especially used where the desired position is the closed position. Many linear accelerators have safety switches which prevent operation of the accelerator when a housing door is not fully closed.

The preferred type of potentiometer is a precision rotary potentiometer having independent linearity in the 0.1% to 1% range, infinite resolution with a shaft supported by either ball bearings or sleeve bearings to reduced end play, run-out and to extend its life over several million cycles. The a/d converter used has preferably 12 bit resolution or better and a high input impedance of 10–20 Mega-ohms.

The drive train, including the gear reduction 3 and the worm gear 7 as well as the linkages and the effective door width, from pivot point of door to where force is applied, must be optimized, individually as well as collectively to properly transfer all operating torques and forces in addition to allowing the door to be manually operated (backdrive) by external forces.

The continuous comparing of door position with desired position, preferably set during installation so that when the measured position is one digital volt or bit different from the desired position, the motor is operated to drive into the desired position. In the preferred embodiment, this one digital volt or one bit difference is approximately 1.5 arc minutes which is considered for all practical purposes to be zero backlash. If for some reason, such as warping or settling of the door or frame, the motor is unable to drive the door to the desired position, the force of the motor, up to the maximum allowed force due to current limiting, will clamp the door as close to the desired position as possible.

Figure 5A:
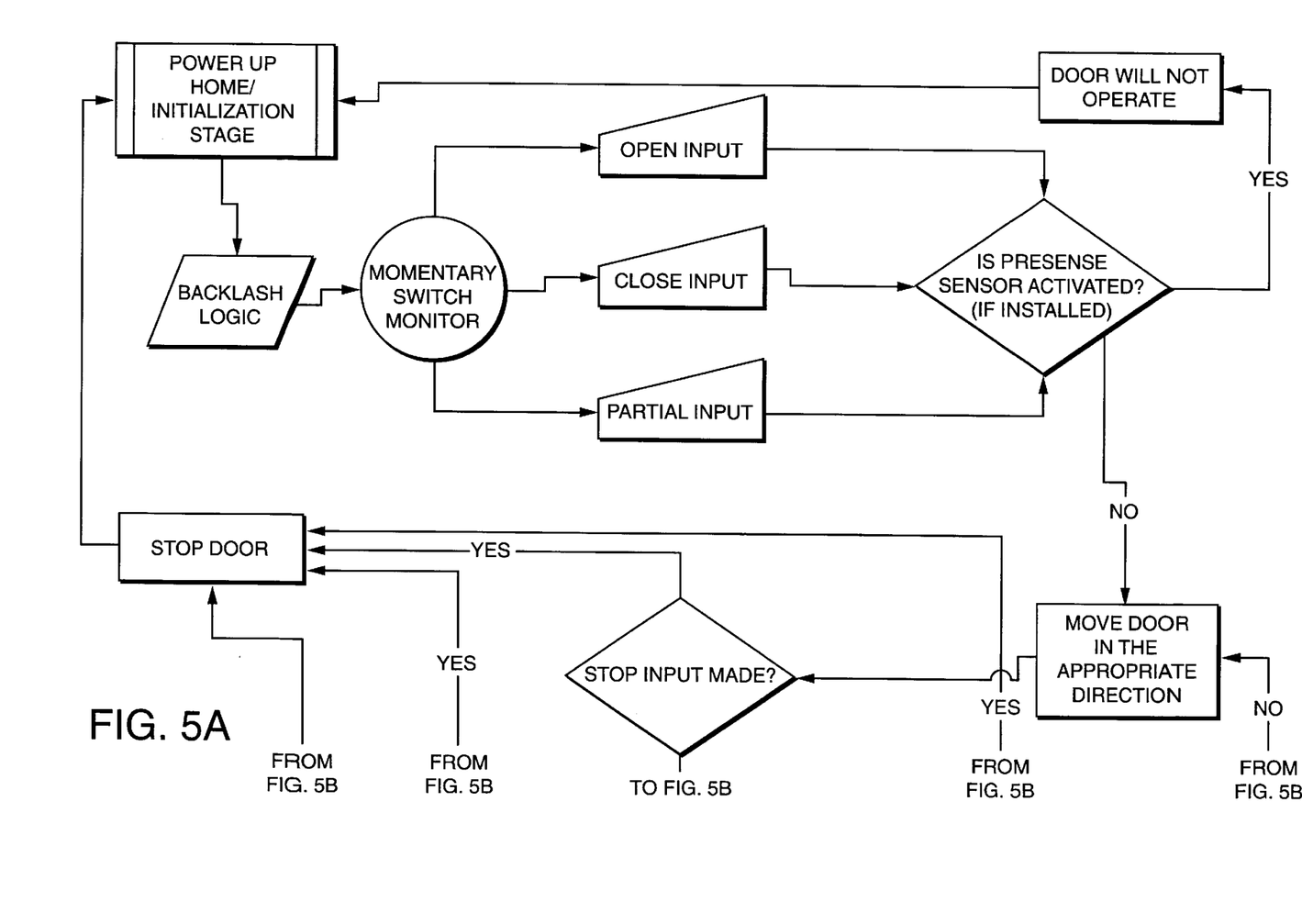
FIG. 5 is a flow chart showing a preferred operation logic of the present invention.
Figure 5B:
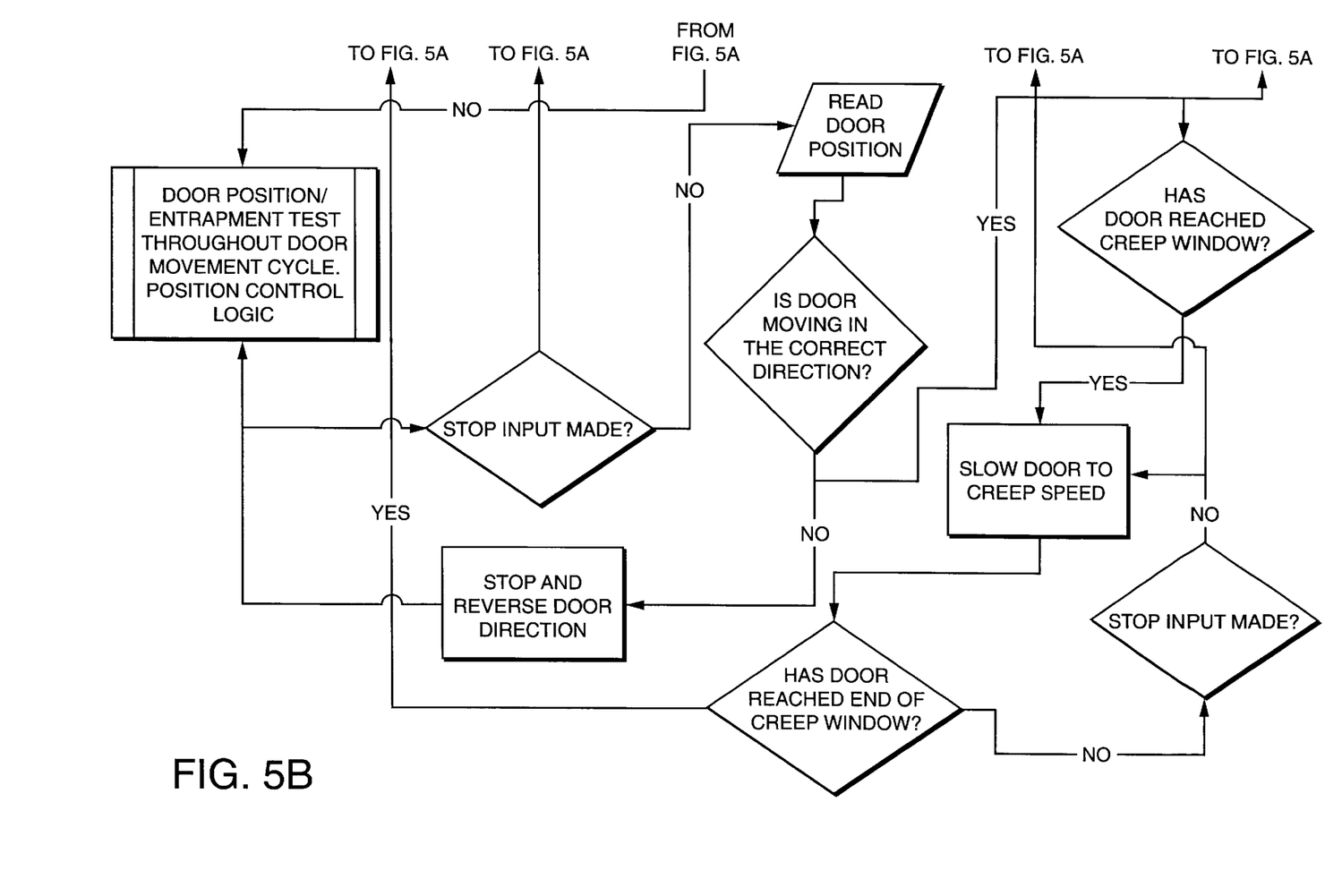
Figure 6:
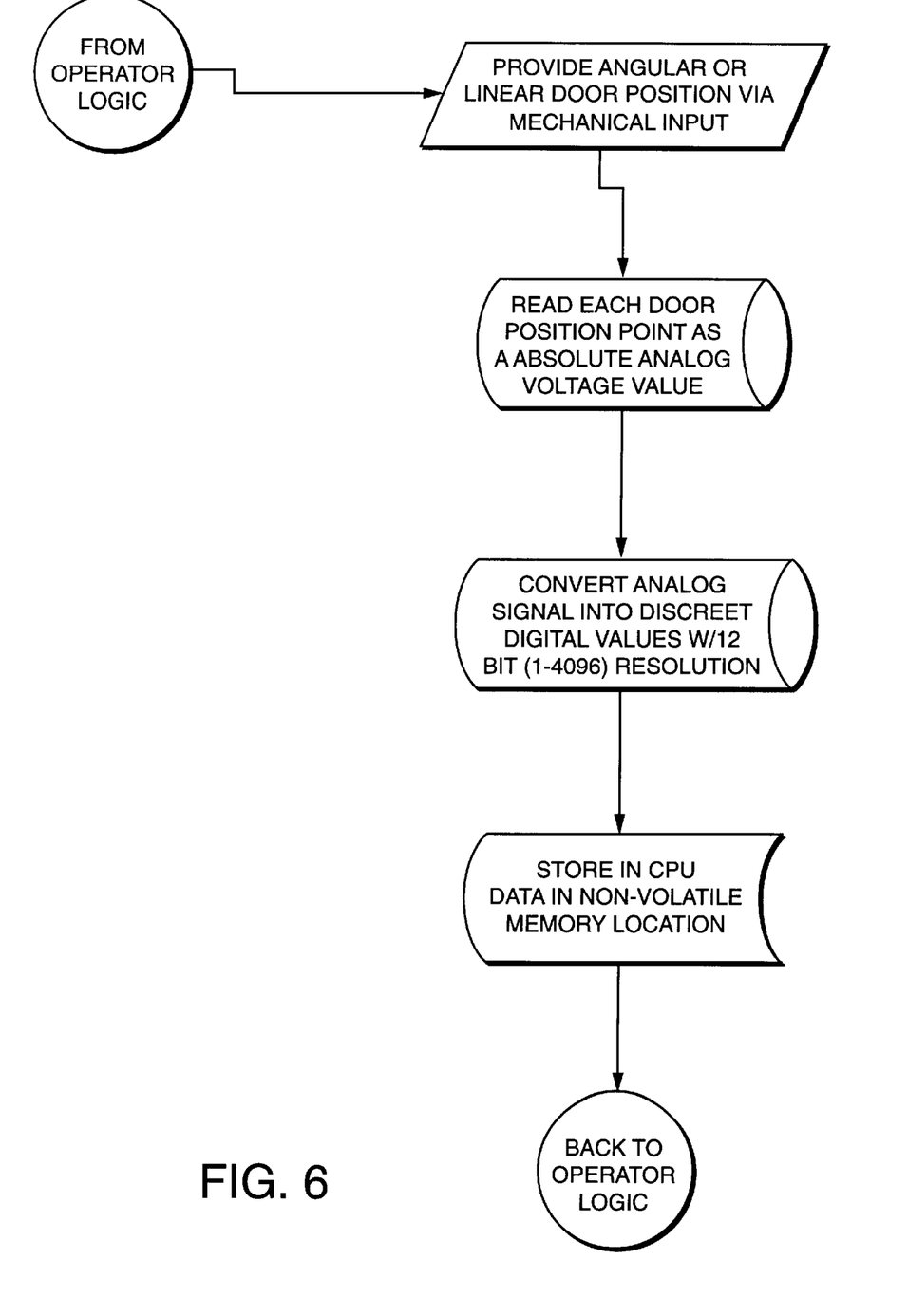
FIG. 6 is a flow chart showing a preferred logic for determining absolute position.

A preferred operation logic is shown in FIG. 5 with the powering up or initialization starting in the upper left hand corner. When the position of the door is required by the automatic door operator, the operator logic performs a logic operation as shown in FIG. 6. Each door position point is read as an absolute analog voltage value from a potentiometer and converted into discreet digital value by a preferably 12 bit A/D converter with the digital value stored in non-volatile memory.

Figure 7:
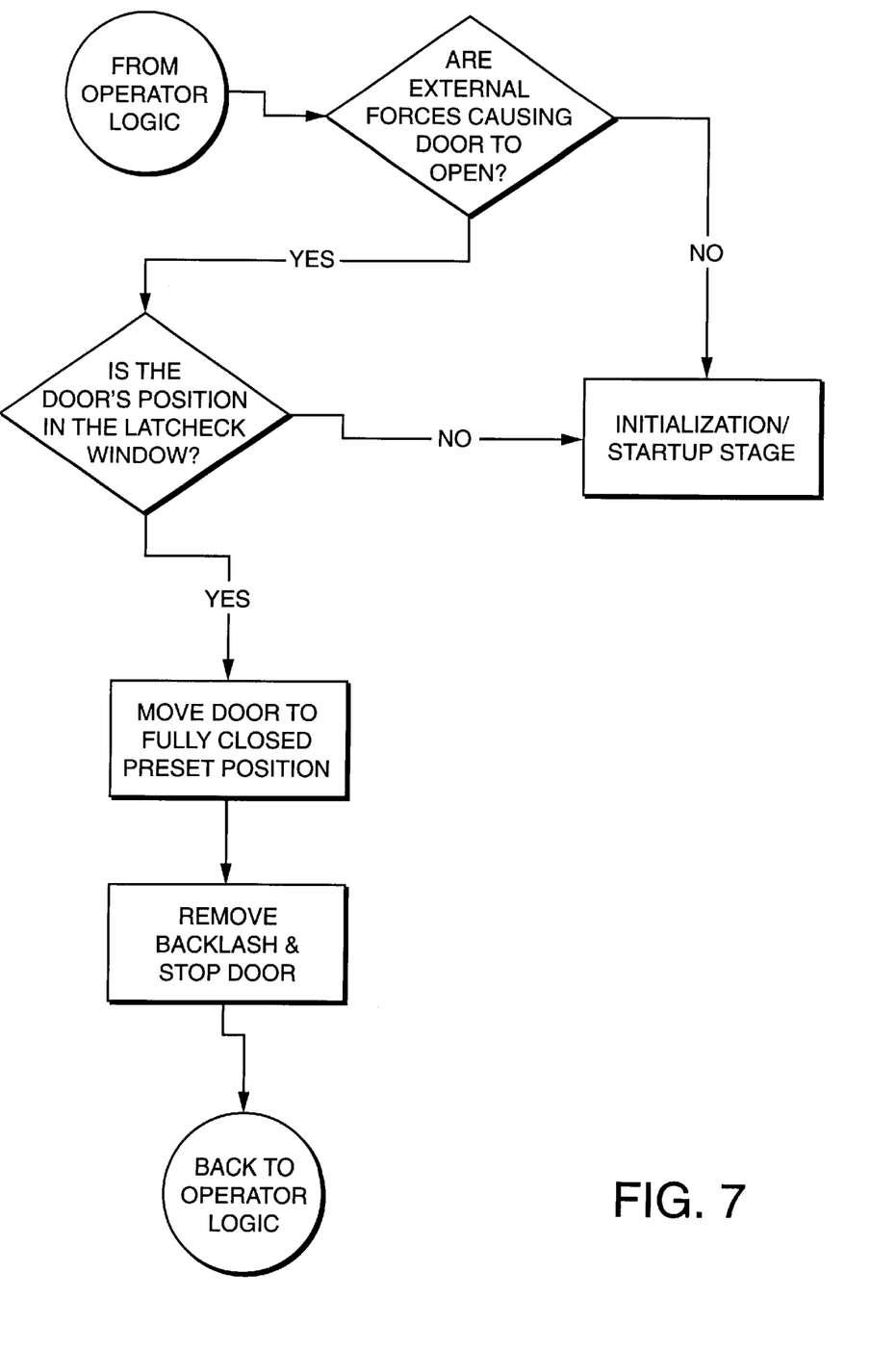
FIG. 7 is a flow chart showing a preferred logic for backlash removal.

The logic for backlash removal is shown in FIG. 7. When backlash needs to be removed, the system is checked to determine if external forces are causing the door to open. If not, the system is restarted/initialized. If yes, the door's position in the latch check window is checked. If not, the system is restarted/initialized. If yes, the door is commanded to the fully closed position to remove backlash.

While specific embodiments of the invention have been shown and described in detail to illustrate the application of the principles of the invention, it will be understood that the invention may be embodied otherwise without departing from such principles.

What is claimed is:

1. An automatic door operator comprising:

a motor connectable to a door for moving the door between an open and closed position;

absolute position transducer measuring an absolute position of the door;

control means sensing an external signal indicating one of an open state and a closed state of the door, said control means comparing said absolute position of the door with said state indicated by said external signal, said control means generating a drive signal to said motor for driving said motor until said absolute position is substantially identical to said state indicated by said external signal.

2. The operator in accordance with claim 1, wherein:

said absolute position transducer measures said absolute position of the door independently of previous positions of the door.

3. The operator in accordance with claim 1, wherein:

said absolute position transducer substantially continuously measures said positions of the door independently of previous positions of the door.

4. The operator in accordance with claim 1, wherein:

said absolute position transducer includes a rotary potentiometer and an analog-to-digital converter for converting an analog output of said potentiometer to a digital position signal;

said control means includes a digital Programmable Logic Controller (PLC) reading said digital position signal.

5. The operator in accordance with claim 4, wherein:

a worm gear drive transfers pivoting movements of the door to said rotary potentiometer.

6. The operator in accordance with claim 1, wherein:

said motor is a full wave four quadrant regenerative drive.

7. The operator in accordance with claim 6, wherein:

said regenerative drive is designed to operate in all directional combinations of electrical driving torque and motor rotation.

8. The operator in accordance with claim 7, wherein:

said control means generates energy of said motor back into an AC source of said motor and provide motor torque opposite of motor rotation of said regenerative drive.

9. The operator in accordance with claim 1, wherein:

said control means substantially continuously compares said absolute position of the door with said state indicated by said external signal after said absolute position is substantially identical to said state indicated by said external signal, and generating said drive signal when said absolute position varies away from said state indicated by said external signal.

10. The operator in accordance with claim 1, wherein:

said control means maintains a magnitude of current delivered to said motor as a result of said drive signal below a predetermined value corresponding to a maximum force allowed to be applied to said door.

11. The operator in accordance with claim 10, wherein:

said maximum force allowed is less than a maximum force possible by said motor.

12. The operator in accordance with claim 1, wherein:

said motor pivotally moves the door between said open and closed positions.

13. The operator in accordance with claim 1, wherein:

a door gear drive connects said motor to the door, said motor and said door gear drive movably connecting the door to said motor when an external force less than or equal to 50 lbs. at 1" from a latch strike is applied to said door and when no said drive signal is applied to said motor.

14. The operator in accordance with claim 2, wherein:

said absolute position transducer measures said continuous positions of the door independently of previous positions of the door;

said absolute position transducer includes a rotary potentiometer and an analog-to-digital converter for converting an analog output of said potentiometer to a digital position signal;

said control means includes a digital Programmable Logic Controller (PLC) reading said digital position signal;

a worm gear drive transfers pivoting movements of the door to said rotary potentiometer;

said motor is a regenerative drive designed to operate in all directional combinations of electrical driving torque and motor rotation;

said control means generates energy of said motor back into an AC source of said motor and provide motor torque opposite of motor rotation of said regenerative drive;

said control means continuously comparing said absolute position of the door with said state indicated by said external signal after said absolute position is substantially identical to said state indicated by said external signal, and generating said drive signal when said absolute position varies away from said state indicated by said external signal;

said control means maintaining a magnitude of current delivered to said motor as a result of said drive signal below a predetermined value corresponding to a maximum force allowed to be applied to said door, said maximum force allowed being less than a maximum force possible by said motor;

said motor pivotally moves the door between said open and closed positions;

a door gear drive connects said motor to the door, said motor and said door gear drive movably connecting the door to said motor when an external force less than 50 lbs. at 1" from a latch strike is applied to said door and when no said drive signal is applied to said motor.

15. The operator in accordance with claim 7, wherein:

said control means electrically drives said regenerative drive in a direction opposite a rotation of said regenerative drive.

* * * * *